(12) United States Patent
Turpin

(10) Patent No.: US 12,420,700 B1
(45) Date of Patent: Sep. 23, 2025

(54) TRUCK BED ORGANIZATION AND POWER SYSTEM

(71) Applicant: Michael Turpin, Clarence, NY (US)

(72) Inventor: Michael Turpin, Clarence, NY (US)

( * ) Notice: Subject to any disclaimer, the term of this patent is extended or adjusted under 35 U.S.C. 154(b) by 0 days.

(21) Appl. No.: 18/948,652

(22) Filed: Nov. 15, 2024

(51) Int. Cl.
  *B60Q 1/00* (2006.01)
  *B60Q 1/26* (2006.01)
  *B60R 9/06* (2006.01)

(52) U.S. Cl.
  CPC ......... *B60Q 1/0035* (2013.01); *B60Q 1/2661* (2013.01); *B60R 9/06* (2013.01)

(58) Field of Classification Search
  CPC .................................................... B60Q 1/0035
  See application file for complete search history.

(56) References Cited

U.S. PATENT DOCUMENTS

| | | | |
|---|---|---|---|
| 8,281,967 B2 | 10/2012 | Evans | |
| 10,040,387 B2 | 8/2018 | Johnston | |
| 11,242,097 B1* | 2/2022 | Gross, IV | H04R 5/02 |
| 11,881,807 B1* | 1/2024 | Elsinawi | H02S 20/30 |
| 2005/0152761 A1 | 7/2005 | Simalianos et al. | |
| 2008/0101885 A1 | 5/2008 | Kmita | |
| 2009/0071991 A1 | 3/2009 | Evans | |
| 2012/0217216 A1* | 8/2012 | Owens | B60P 1/5423 |
| | | | 212/277 |
| 2014/0266001 A1* | 9/2014 | Wilde | H02J 7/35 |
| | | | 320/101 |
| 2015/0251539 A1* | 9/2015 | Sura | B60L 1/20 |
| | | | 290/1 R |
| 2016/0129827 A1 | 5/2016 | Johnston | |
| 2016/0311377 A1* | 10/2016 | Aftanas | H02S 20/30 |
| 2018/0126932 A1 | 5/2018 | Secord | |
| 2020/0122636 A1* | 4/2020 | Oh | B60R 11/06 |
| 2020/0290525 A1* | 9/2020 | Viniegra | B60R 11/06 |
| 2020/0298705 A1* | 9/2020 | Gaither | B60R 16/033 |
| 2023/0234649 A1* | 7/2023 | Stephan | B62D 33/0273 |
| | | | 296/57.1 |
| 2023/0256887 A1* | 8/2023 | Harmon | B60R 9/02 |
| | | | 224/404 |
| 2023/0322168 A1 | 10/2023 | Shimp et al. | |
| 2023/0373402 A1 | 11/2023 | Bernal et al. | |
| 2023/0391271 A1* | 12/2023 | Harmon | B60R 5/003 |
| 2024/0075891 A1* | 3/2024 | Salter | B60R 16/0238 |

(Continued)

*Primary Examiner* — Brian D Nash
(74) *Attorney, Agent, or Firm* — Gugliotta & Gugliotta LPA

(57) ABSTRACT

A truck bed organization and power system is provided having adjustable vertical panels secured by horizontal rods, with integrated power and lighting capabilities. The system includes two vertical panels that can be positioned anywhere along adjustable horizontal rods to accommodate various truck bed sizes and cargo configurations. A power management unit integrated into one panel includes USB ports and a removable, rechargeable battery pack capable of providing both USB charging and 27V DC power output. An LED lighting system incorporated into the panels automatically activates when the truck bed door opens through a sensor unit, with manual override capability. The system enables secure cargo organization while providing convenient power access and illumination for activities such as tailgating, camping, or contractor work. The modular design allows for quick installation and removal without permanent vehicle modification, enhancing truck bed utility across diverse applications.

17 Claims, 3 Drawing Sheets

(56) References Cited

U.S. PATENT DOCUMENTS

| | | | |
|---|---|---|---|
| 2024/0270150 A1 | 8/2024 | Holmstrom et al. | |
| 2024/0380227 A1* | 11/2024 | Van Straten | H02J 7/0049 |
| 2024/0387940 A1* | 11/2024 | Harvey | H01M 10/658 |
| 2025/0033710 A1* | 1/2025 | Taylor | B62D 33/0273 |

* cited by examiner

Power Management Unit 140 - Circuit Diagram

TRUCK BED ORGANIZATION AND POWER SYSTEM

CROSS-REFERENCE TO RELATED APPLICATIONS

There are no previously filed, nor currently any co-pending applications, anywhere in the world.

BACKGROUND OF THE INVENTION

1. Field of the Invention

The present invention relates generally to truck bed organization systems and, more particularly, to an adjustable truck bed divider system incorporating integrated power supply and illumination capabilities.

2. Description of the Related Art

In modern transportation and logistics, pickup trucks serve as versatile vehicles that combine robust towing capabilities with spacious cargo areas. Despite their utility, pickup truck beds present several persistent challenges that impact user convenience and functionality. A primary issue occurs during partial load scenarios, where smaller items such as groceries or tools are prone to shifting and rolling within the bed during transit. This movement not only risks damage to the items but also creates difficulties in retrieval, particularly when objects migrate toward the cab area.

Furthermore, contemporary pickup truck designs typically lack adequate illumination in the bed area, particularly near the tailgate. This deficiency creates significant operational challenges during low-light conditions or nighttime use, impacting loading and unloading efficiency and safety. The situation becomes more problematic during outdoor activities such as camping or construction work, where visibility is crucial for task completion and safety.

An additional limitation of current pickup truck designs relates to power availability at the rear of the vehicle. While modern vehicles increasingly incorporate power outlets and USB ports in the cabin area, there is a notable absence of convenient charging capabilities in the bed area. This shortcoming becomes particularly apparent during activities such as tailgating, outdoor work, or recreational camping, where users require power for electronic devices but must rely on cabin-based outlets or separate portable power solutions.

Existing solutions typically address these challenges individually, requiring users to employ multiple separate accessories: cargo management systems for organization, portable lighting solutions for visibility, and independent power banks for charging capabilities. This fragmented approach not only increases complexity and cost but also reduces the overall utility and convenience of the pickup truck bed space.

The present innovation addresses these concurrent challenges through an integrated solution that combines cargo management, illumination, and power delivery functionalities in a single, adaptable system. This approach not only resolves the individual issues but does so in a manner that enhances the overall utility of pickup truck beds while maintaining the flexibility and versatility that makes these vehicles essential for modern transportation needs.

SUMMARY OF THE INVENTION

It is thus an object of the present invention to provide an integrated solution for organizing cargo within a pickup truck bed while simultaneously providing power and illumination capabilities.

It is a further object of the present invention to provide a versatile divider system that can be adapted to different truck bed sizes and configurations.

It is still a further object of the present invention to provide automatic illumination capabilities that activate based on tailgate operation.

The present invention provides a truck bed organization and power system. In preferred embodiments, the inventive system includes: two vertical, adjustable panels that can fit various truck models; two horizontal adjustable rods for securing the panels; integrated USB ports for device charging; a removable and rechargeable battery; LED lights with a sensor that activates when the truck bed door is opened; and a charging system capable of powering small electronic devices.

It is an advantage of the present invention that cargo and small items can be secured in any location within a pickup truck bed through the use of adjustable panels, preventing unwanted movement during transit.

It is an advantage of the present invention that users can tailor the divider configuration to accommodate different truck bed sizes and shapes through its adjustable rod mechanism, ensuring compatibility across multiple vehicle makes and models.

It is an advantage of the present invention that automatic illumination is provided when the truck bed door opens, enhancing visibility and safety during nighttime operations without requiring manual activation.

It is an advantage of the present invention that integrated USB charging ports enable convenient power access for mobile devices directly from the truck bed area, eliminating the need to route cables from the cabin.

It is an advantage of the present invention that the removable and rechargeable battery system provides portable power capability, allowing users to maintain electrical functionality even when disconnected from the vehicle.

It is an advantage of the present invention that small electronic devices can be powered through the 27V DC charging system, supporting extended outdoor activities such as camping or remote work situations.

It is an advantage of the present invention that the integrated design combines multiple functionalities into a single unit, reducing the need for separate accessories and maximizing bed space utility.

It is an advantage of the present invention that the system can be rapidly installed or removed as needed, providing flexibility for different use scenarios without permanent vehicle modification.

It is an advantage of the present invention that the system enhances the functionality of pickup trucks for both recreational activities such as tailgating and practical applications such as grocery transport or contractor work.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

Figure 1:
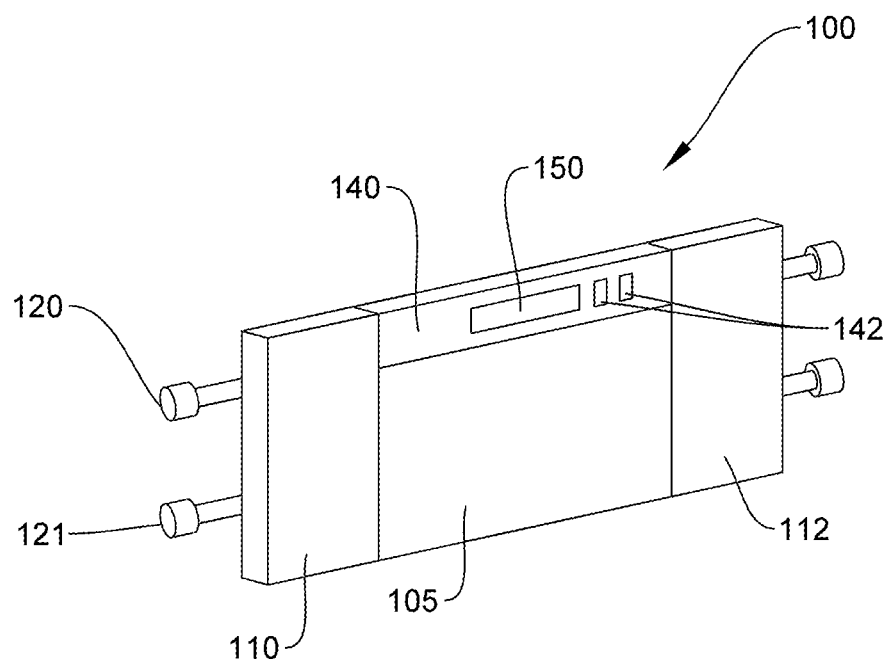
FIG. 1 is a front perspective view of a truck bed organization and power system according to a preferred embodiment of the present invention.
Figure 2:
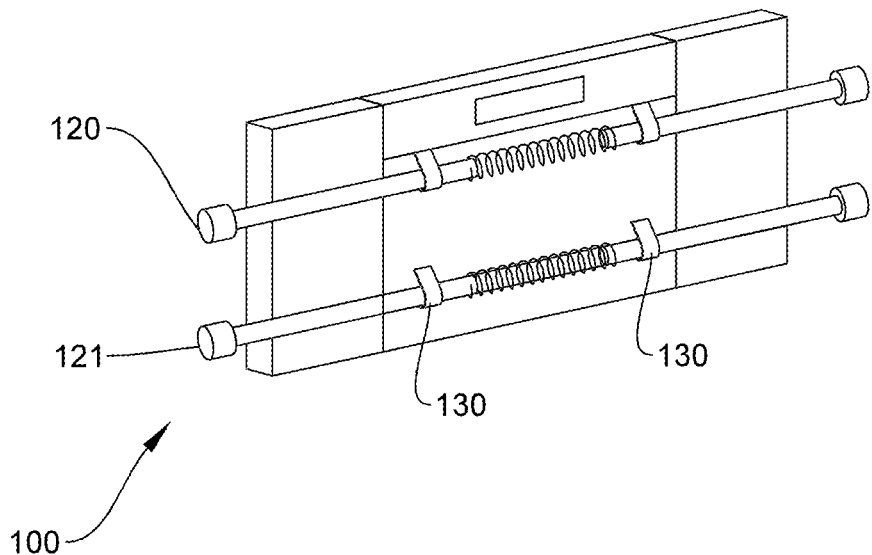
FIG. 2 is a rear perspective, partially exploded view thereof.
Figure 3:
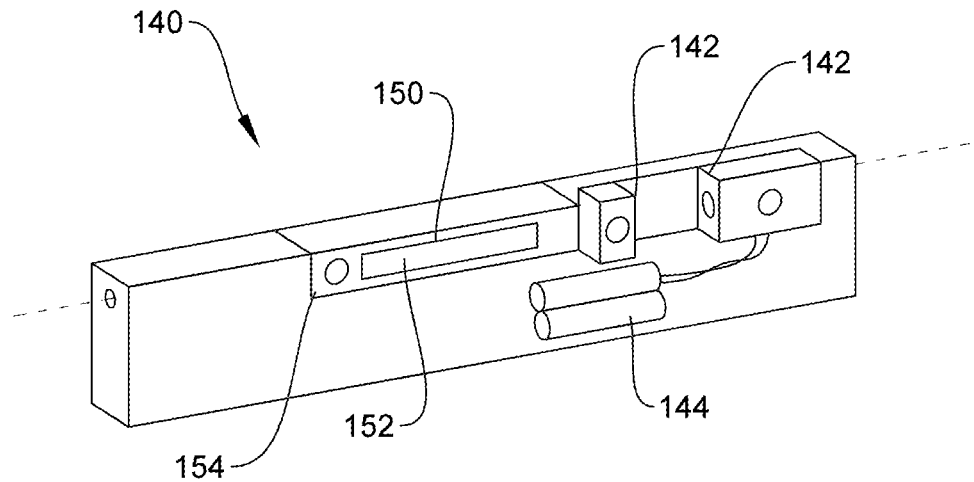
FIG. 3 is a detail schematic view of a XXXX for use therewith.
Figure 4:
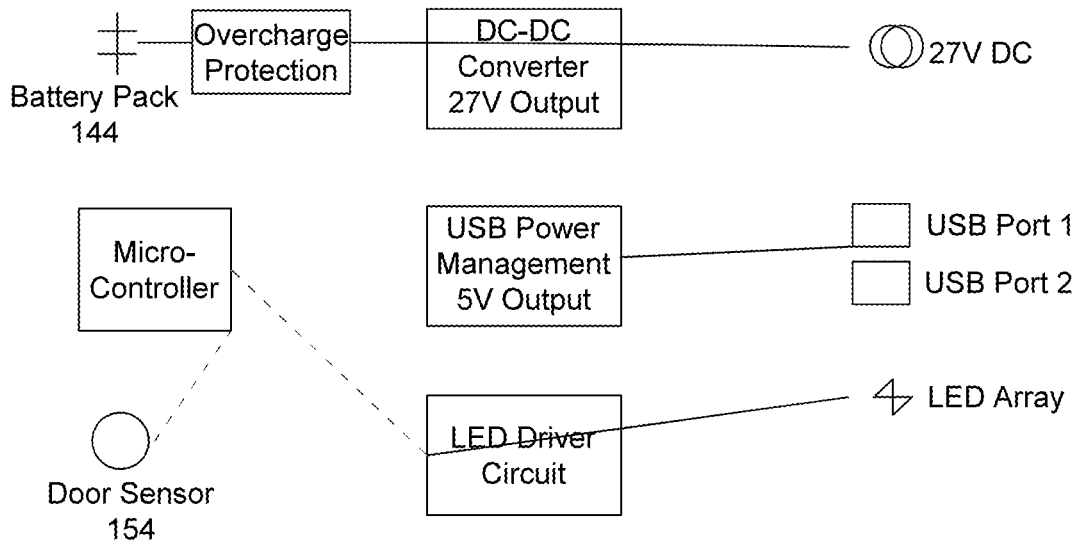
FIG. 4 is an exemplary electrical schematic for the XXX.
Figure 5:
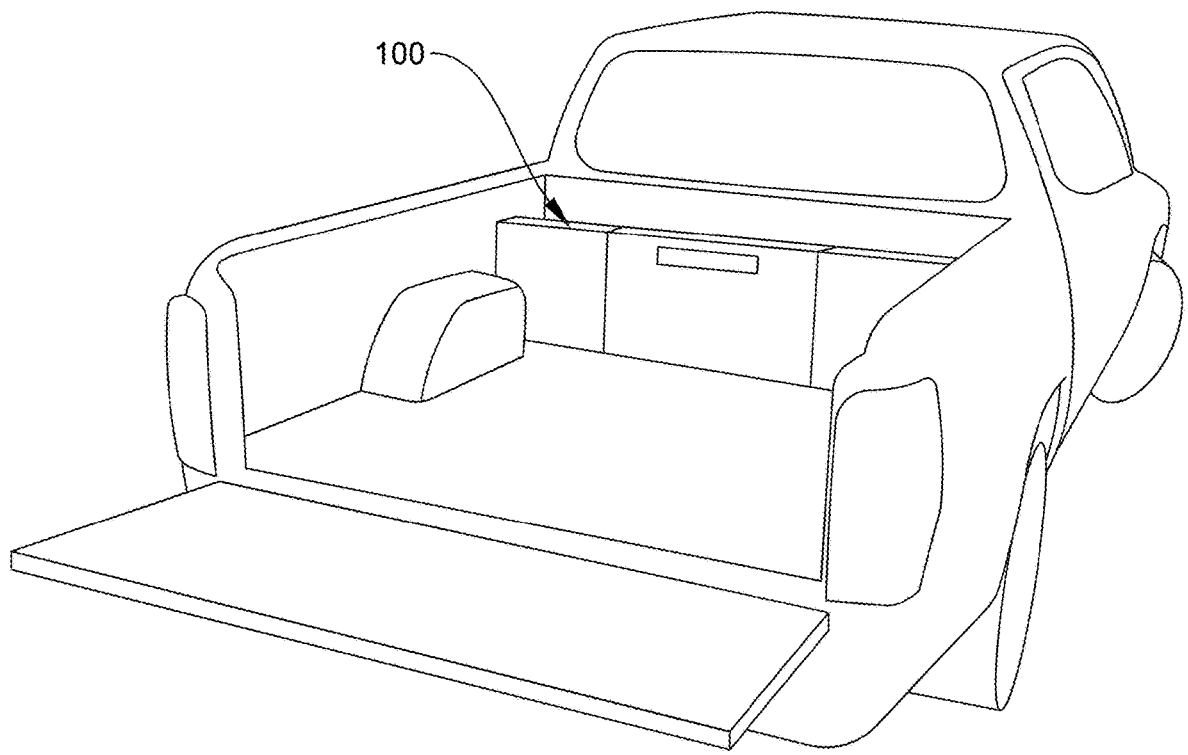
FIG. 5 is a perspective view of the truck bed organization and power system according to the present invention shown installed in a pickup truck bed.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. DETAILED DESCRIPTION OF THE FIGURES

Referring now to the drawings, wherein like reference numerals indicate the same parts throughout the several views, a truck bed organization and power system, generally noted as 100, is shown according to a preferred embodiment of the present invention. The system 100 comprises a vertical central panel 105 bounded at each side by two vertical panels 110, 112 that are adjustable in both height and width to accommodate various truck bed dimensions. The assembly of connected panels 105, 110, 112 is secured by two horizontal adjustable rods 120, 122, positioned at the top and bottom of the panel assembly respectively.

The panels 105, 110, 112 are constructed of durable material suitable for withstanding typical truck bed use conditions. According to a preferred embodiment, the central panel 105 may be formed of a rigid material such a wood, plastic, metal or the like; and, the side panels 110, 112 may be similarly form with the additional functionality as to be extendable laterally to adjust an overall width to the system 110 to fit a corresponding truck bed width. Each panel includes integrated mounting points 130 for securing the horizontal rods 120, 122. The mounting points 130 are designed to allow for quick adjustment and secure locking of the panels in desired positions along the length of the truck bed.

A power management unit 140 is integrated into one of the vertical panels, preferably the central panel 105. The power management 140 may incorporate at least one, and preferably multiple USB ports 142 for device charging. The power management unit 140 houses a removable and rechargeable battery pack 144 that can be easily accessed through a secure compartment door 146. The battery pack 144 is configured to provide standard USB charging capabilities as well as 27V DC power output for supporting small electronic devices.

An LED lighting system 150 is incorporated into an upper portions of, preferably, the central panel 105. The lighting system 150 includes multiple high-efficiency LED elements 152 positioned to provide optimal illumination of the truck bed area. A sensor unit 154 is integrated into the system, positioned to detect the opening of the truck bed door, automatically activating the LED lighting system 150 when the door is opened. Shown herein is the sensor unit 154 being a proximity sensor or other functionally similar non-contact sensor. However, as should be apparent to those having ordinary skill in the relevant art, in light of the present teachings, other contact-type sensors may equivalently be used.

2. OPERATION OF THE PREFERRED EMBODIMENT

In operation, the system 100 is initially installed by adjusting the horizontal rods 120, 122 to match the width of the specific truck bed. The vertical panels 105, 110, 112 are then secured between the rods using the mounting points 130, with their height adjusted to match the bed walls. This configuration can be modified as needed based on cargo requirements, with the panels being repositionable anywhere along the length of the truck bed.

The power management system functions through the rechargeable battery pack 144, which can be charged either through a vehicle power connection or independently when removed from the unit. When installed, the battery pack 144 provides power to both the USB ports 142 and the 27V DC output. The power management unit 140 includes protective circuitry to prevent overcharging and ensure safe power distribution to connected devices.

The LED lighting system 150 operates automatically through the sensor unit 154, which detects the opening motion of the truck bed door. Upon detection, the lighting system activates immediately, providing illumination for loading and unloading activities. The system includes an optional manual override switch 156 for situations requiring extended lighting operation.

It is an advantage of the present invention that cargo and small items can be secured in any location within the truck bed through the use of the adjustable panels 110, 112, preventing unwanted movement during transit. The integrated power and lighting capabilities enhance the utility of the system, particularly during outdoor activities or nighttime operations.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar caselaw or subsequent precedent should not be made if any future claims are added or amended subsequent to this Patent Application.

The invention claimed is:

1. A truck bed organization and power system comprising:
   a first vertical panel and a second vertical panel;
   a first horizontal rod and a second horizontal rod, wherein said first and second vertical panels are coupled to and supported by said first and second horizontal rods;
   wherein said first and second vertical panels are adjustably positionable along the length of said first and second horizontal rods;
   a power management unit integrated into at least one of said vertical panels;
   a lighting system integrated into at least one of said vertical panels; and
   wherein said first and second horizontal rods are adjustable in length to accommodate different truck bed widths.

2. The system of claim 1, wherein said power management unit comprises:
   a removable battery pack operatively connected to at least one USB charging port;
   a DC power output; and
   wherein said power management unit further comprises protective circuitry configured to prevent overcharging of said removable battery pack.

3. The system of claim 2, wherein said DC power output is configured to provide 27V DC power.

4. The system of claim 2, wherein said removable battery pack is configured to be charged through either a vehicle power connection or independently when removed from said power management unit.

5. The system of claim 2, wherein said DC power output is configured for supporting extended outdoor activities.

6. The system of claim 1, wherein said lighting system comprises:
   a plurality of LED elements;
   a sensor unit configured to detect opening of a truck bed door; and
   control circuitry configured to automatically activate said LED elements in response to detection of said truck bed door opening.

7. The system of claim 6, further comprising a manual override switch for controlling said LED elements independent of said sensor unit.

8. The system of claim 6, wherein said lighting system further comprises LED elements positioned to provide optimal illumination of the truck bed area.

9. The system of claim 1, wherein each of said first and second vertical panels comprises mounting points configured to engage with said first and second horizontal rods.

10. The system of claim 9, wherein said mounting points are configured to allow position adjustment and locking of said vertical panels along said horizontal rods.

11. The system of claim 1, wherein said central panel is rigid and said side panels are extendable laterally to adjust an overall width of the system to fit a corresponding truck bed width.

12. The system of claim 1, wherein said sensor unit comprises a proximity sensor configured to detect opening of the truck bed door and automatically activate said LED lighting system.

13. The system of claim 1, wherein said removable battery pack is accessible through a secure compartment door integrated into one of said vertical panels.

14. The system of claim 1, wherein said mounting points on said vertical panels are configured for quick adjustment and secure locking of said panels in desired positions.

15. The system of claim 1, wherein the system is rapidly installable or removable without permanent vehicle modification.

16. The system of claim 1, wherein said first and second horizontal rods are positioned at the top and bottom of the panel assembly respectively.

17. A method of organizing a truck bed space comprising:
   providing first and second vertical panels;
   coupling said first and second vertical panels to a first and second horizontal rods such that said vertical panels are supported by said horizontal rods;
   adjusting positions of said vertical panels along said horizontal rods to create a designated cargo space;
   providing electrical power through a power management unit integrated into at least one of said vertical panels;
   automatically illuminating said cargo space in response to opening of a truck bed door;
   adjusting lengths of said first and second horizontal rods to match a width of said truck bed; and
   adjusting heights of said first and second vertical panels to match walls of said truck bed.

* * * * *